US012299545B2

(12) United States Patent
Mazor et al.

(10) Patent No.: US 12,299,545 B2
(45) Date of Patent: *May 13, 2025

(54) SYSTEMS AND METHODS FOR AUTOMATIC EXTRACTION OF CLASSIFICATION TRAINING DATA

(71) Applicant: Exceed AI Ltd, Tel-Aviv (IL)

(72) Inventors: Igal Mazor, Tel-Aviv (IL); Yaron Ismah-Moshe, Tel-Aviv (IL)

( * ) Notice: Subject to any disclaimer, the term of this patent is extended or adjusted under 35 U.S.C. 154(b) by 1088 days.

This patent is subject to a terminal disclaimer.

(21) Appl. No.: 17/125,120

(22) Filed: Dec. 17, 2020

(65) Prior Publication Data

US 2022/0198316 A1 Jun. 23, 2022

(51) Int. Cl.
*G06N 20/00* (2019.01)

(52) U.S. Cl.
CPC .................. *G06N 20/00* (2019.01)

(58) Field of Classification Search
CPC ........ G06N 20/00; G06N 3/045; G06N 3/048; G06N 3/08; G06F 40/30; G06F 40/284
USPC ........................................................... 706/12
See application file for complete search history.

(56) References Cited

U.S. PATENT DOCUMENTS

| 2013/0024407 A1* | 1/2013 | Thompson | G06F 16/353 706/12 |
| 2015/0310862 A1* | 10/2015 | Dauphin | G06F 40/30 704/257 |
| 2019/0370398 A1* | 12/2019 | He | G06N 20/00 |
| 2020/0142999 A1* | 5/2020 | Pedersen | G06K 9/6263 |
| 2020/0285702 A1* | 9/2020 | Padhi | G06N 3/0445 |
| 2020/0344194 A1* | 10/2020 | Hosseinisianaki | G06N 3/08 |
| 2020/0401844 A1* | 12/2020 | Han | G06K 9/6234 |
| 2021/0034988 A1* | 2/2021 | Adel-Vu | G06K 9/628 |

FOREIGN PATENT DOCUMENTS

| CN | 111061881 A | * | 4/2020 | ............. G06F 16/35 |
| CN | 111475648 A | * | 7/2020 | ............. G06F 16/35 |
| CN | 111930939 A | * | 11/2020 | ............. G06F 16/35 |
| CN | 112214595 A | * | 1/2021 | ............. G06F 16/35 |

OTHER PUBLICATIONS

Jiang, "A Hierarchical Model with Recurrent Convolutional Neural Networks for Sequential Sentence Classification", NLPCC 2019, LNAI 11839, pp. 78-89, 2019. (Previously provided). (Year: 2019).*

(Continued)

*Primary Examiner* — Dave Misir (57) ABSTRACT

A method for training a multi-class classification model includes receiving training data corresponding to a plurality of classes. For each class in the plurality of classes, the method includes training a binary classification model configured to determine whether or not an observation of training data belongs to the class and for each observation of training data identified as belonging to the class, extracting one or more class identification features from the observation of training data based on activations of an intermediate attention layer in the binary classification model. A multi-class classification model is trained using the class identification features extracted for each of the plurality of classes.

20 Claims, 5 Drawing Sheets

(56) References Cited

OTHER PUBLICATIONS

Qing, "A Novel Neural Network-Based Method for Medical Text Classification", Future Internet 2019. (Previously provided). (Year: 2019).*

Parwez, "Multi-Label Classification of Microblogging Texts Using Convolution Neural Network", IEEE Access, vol. 7, 2019. (Previously provided). (Year: 2019).*

Li, "A Survey on Text Classification: From Shallow to Deep Learning", IEEE Transactions on Neural Networks and Learning Systems, vol. 31, No. 11, Oct. 2020. (Previously provided). (Year: 2020).*

International Search Report and Written Opinion for co-pending PCT application PCT/US2021/063970 mailed May 9, 2022.

Hiitlee: "SALNet Semi-Supervised Few-Shot Text Classification with Attention-Based Lexicon", GitHub, Dec. 12, 2020, XP055912048, Retrieved from the internet—URL: https://github.com/HiitLee/SALNet/commit/c49cefd94cbeb15abeb8876e50c0a108f0d8bef9.

Hiitlee: "SALNet: Semi-Supervised Few-Shot Text Classification with Attention-based Lexicon Construction", Dec. 12, 2020, XP055912091, Retrieved from the internet—URL: https://github.com/HiitLee/SALNet.

Lee Ju-Hyoung et al.: "SALNet: Semi-Supervised Few-Shot Text Classification with Attention-Based Lexicon Construction", Proceedings of the AAAI Conference on Artificial Intelligence, Feb. 9, 2021, pp. 13189-13197, XP055912113, ISBN: 978-1-57735-866-4, Retrieved from the internet—URL: https://ojs.aaai.org/index.php/AAAI/article/view/17558/17365. Late publication corresponding to XP055912048.

Matthew Tang et al., "Progress Notes Classification and Keyword Extraction using Attention-based Deep Learning Models with BERT", arxiv.org, Cornell University Library, 201 Olin Library Cornell University Ithaca, NY 14853, Oct. 13, 2019, XP081514755, abstract sections III to VI; figures 1-5; tables I-IV.

\* cited by examiner

SYSTEMS AND METHODS FOR AUTOMATIC EXTRACTION OF CLASSIFICATION TRAINING DATA

FIELD OF THE INVENTION

This invention relates in general to the field of data classification using deep learning models and, in particular, to the classification of text documents.

BACKGROUND OF THE INVENTION

Deep learning models can be used to classify various forms of data. It is known to train these deep learning models based on a corpus of training data which includes a large number of data observations with pre-assigned classifications. Using machine learning techniques, a deep learning model to assign a previously unseen data observation to one of the plurality of classifications seen in the training data. In general, the larger the corpus of training data the greater accuracy of the trained model, and the greater the number of classifications that can be accurately trained.

One example of a classification model is a text classification model, where input text documents are assigned to one of a plurality of classifications. For example, an email management tool may use a text classification model to automatically assign incoming mail to one of a plurality of known classes. The email management tool may automatically take action, e.g. generate responses or follow-up tasks, based on the assigned class.

Figure 1:
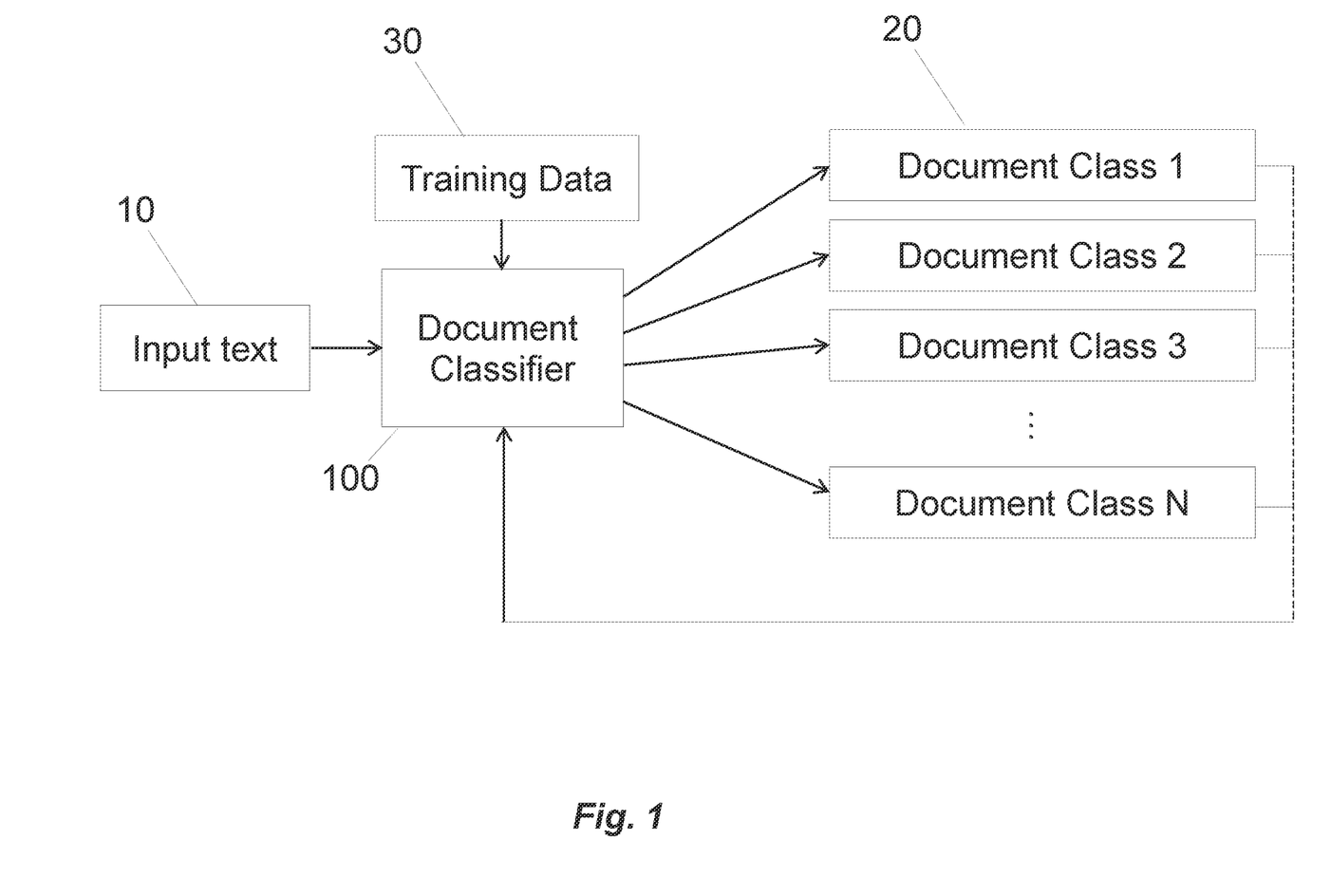
FIG. 1 is schematic diagram showing a conventional document classifier system known in the art.

FIG. 1 is a schematic diagram showing a conventional document classifier 100 known in the art, e.g. an email management tool which uses a text classification model. The document classifier 100 is configured to receive an input text 10 in the form of a text document, e.g. an email. The document classifier 100 then assigns the input text 10 to one of a plurality, N, document classes 20. Where feedback is available, for example through supervision, sampling or client feedback, then an update mechanism may improve the text classification model by positive reinforcement of a correct result and negative reinforcement of an incorrect result.

In an initial training phase, the document classifier 100 receives training data 30 in the form of a plurality of email documents. The email documents in the training data 30 may be referred to as observations. Each email document in the training data 30 is provided with a pre-assigned classification, for example, each email may be classified according to an intent or purpose of the author. In some embodiments, for example, the training data 30 may comprise a plurality of email replies to an outgoing email communication, such as a marketing email. The replies may be classified into one or more classes such as 'not interested', 'interested', 'existing customer', 'wrong person', 'unsubscribe', 'left company', 'contact later', etc.

Following a conventional machine learning technique, parameters of the text classification model are randomised in an initial state and the email documents are assigned to the plurality of classes 20. The update mechanism is used to improve the parameters of the text classification model by comparing the assignments to the known classification of each email document. This process is repeated until the document classifier 100 can reliably assign the email documents of the training data 30 to the correct classes 20.

At this stage, it is intended that the text classification model can also accurately assign previously unseen email documents. However, the number of documents required to train the text classification model to a satisfactory level of accuracy may be larger than the number of training documents available, e.g. a number of stored and classified emails. In addition, some email documents may be particularly difficult to classify correctly. The following is an example of such an email document that can potentially be misclassified by a multi-class classification model:

"Sorry for taking so long to get back to you, I reviewed your offer with my manager yesterday. Even though it seems like a good fit at the moment we don't have the budget for it. We will contact you if it ever becomes a priority in the future. Thanks for your time!".

This example can easily be misclassified as "interested" instead of "not interested".

Furthermore, creating additional training data by labelling an unclassified training corpus can be laborious and inefficient. Furthermore, remedying a low model accuracy by using the update mechanism on real world data over a period of time can lead to an unacceptable number of errors in an early stage. Furthermore, even obtaining a larger amount of training data can impede the speed and processing efficiency of the training process if parts of the training documents are not relevant to the class.

As such, there is a need to improve the corpus of training data. The present invention aims to address this need.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present invention provides for systems and methods related to training a multi-class classification model, which includes receiving training data corresponding to a plurality of classes. Embodiments of the invention comprise training, for each class in the plurality of classes, a binary classification model configured to determine whether or not an observation of training data belongs to the class and, for each observation of training data identified as belonging to the class, extracting one or more class identification features from the observation of training data based on activations of an intermediate attention layer in the binary classification model.

In at least one embodiment, a method for detecting a marker is provided. The method comprises receiving, by a processor, training data corresponding to a plurality of classes; and, for each class in the plurality of classes: training, by the processor, a binary classification model configured to determine whether or not an observation of training data belongs to the class; for each observation of training data identified as belonging to the class, extracting one or more class identification features from the observation of training data based on activations of an intermediate attention layer in the binary classification model; and training, by the processor, a multi-class classification model using the class identification features extracted for each of the plurality of classes.

In at least a further embodiment, a processing apparatus comprises at least one processor configured to execute a method comprising the steps of: receiving, by a processor, training data corresponding to a plurality of classes; and, for each class in the plurality of classes: training, by the processor, a binary classification model configured to determine whether or not an observation of training data belongs to the class; for each observation of training data identified as belonging to the class, extracting one or more class identification features from the observation of training data based on activations of an intermediate attention layer in the binary classification model; and training, by the processor, a multi-class classification model using the class identification features extracted for each of the plurality of classes.

In at least an additional embodiment of the present invention, a computer-readable medium comprises non-transitory, computer-readable medium configured to store instructions which, when executed by a processor, causes the processor to execute a method comprising the steps of: receiving, by the processor, training data corresponding to a plurality of classes; and, for each class in the plurality of classes: training, by the processor, a binary classification model configured to determine whether or not an observation of training data belongs to the class; for each observation of training data identified as belonging to the class, extracting one or more class identification features from the observation of training data based on activations of an intermediate attention layer in the binary classification model; and training, by the processor, a multi-class classification model using the class identification features extracted for each of the plurality of classes.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION OF THE INVENTION

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention, Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The present invention relates to a processing apparatus and a method for training a classification model. In particular, a processing method is applied to a new corpus of training data prior to training the classification model, and the classification model is trained using the processed training data.

The classification model may be a document classification model and may be configured to assign a plurality of text documents to a plurality of document classes. For example, a document classification model may receive a plurality of incoming emails and assign each incoming email to a class according to an intent of the author. Alternatively, in some embodiments the classification may be, for example, an image classification model.

Figure 2:
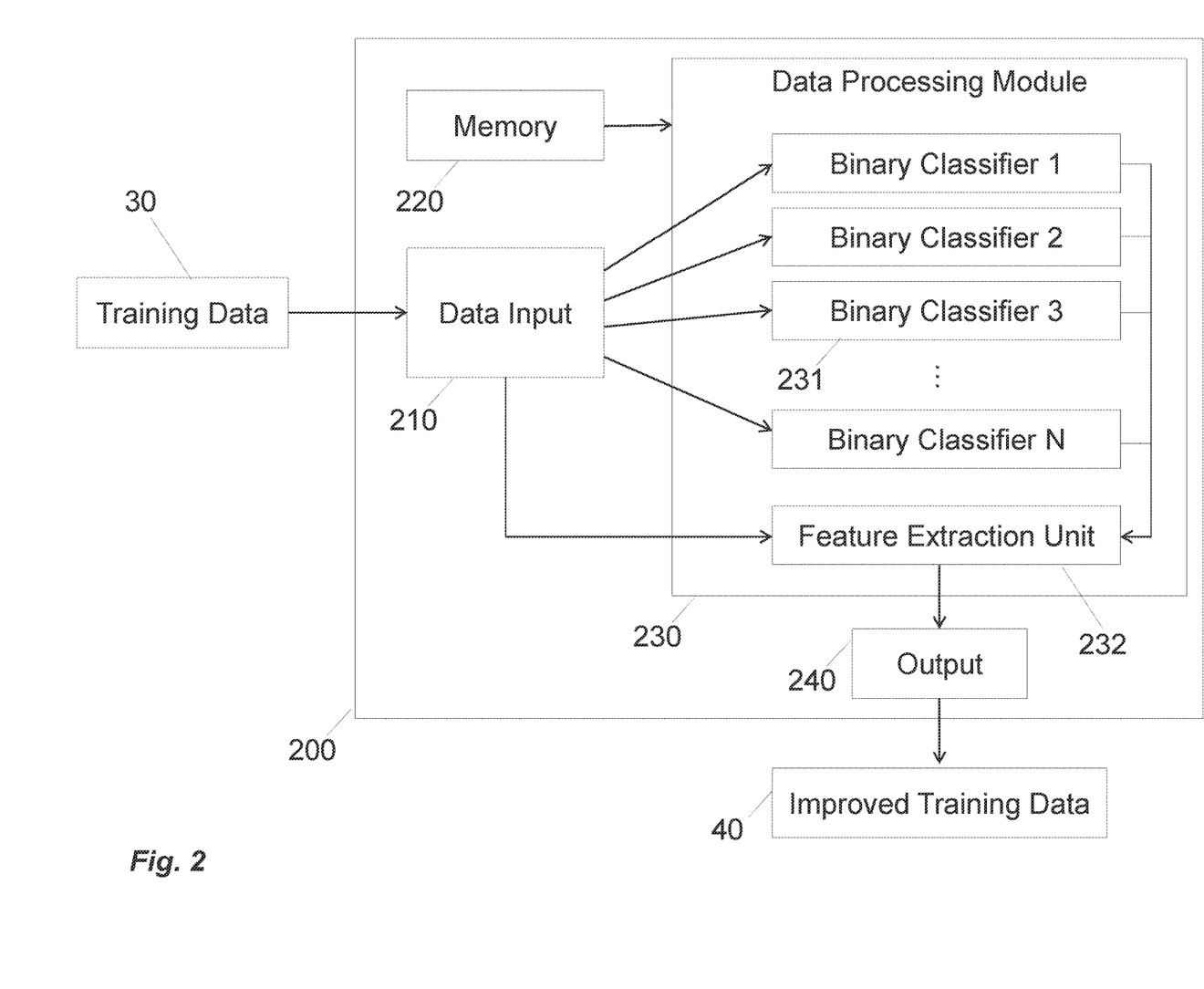
FIG. 2 is a schematic diagram showing a processing apparatus, according to an embodiment of the present invention.

FIG. 2 of the accompanying drawings shows a schematic diagram of an embodiment of a processing apparatus 200 according to the present invention. The processing apparatus 200 comprises a data input 210, a memory 220, a data processing module 230, and an output 240. The processing apparatus 200 is configured to train a multi-class configuration model. The multi-class classification model may be a document classification model The data input 210 is configured to receive training data 30 corresponding to a plurality of classes. In some examples, training data 30 may be received through a local connection, over a network connection or may be retrieved from a local storage.

Where the multi-class classification model is a document classification model, the training data 30 may comprise a plurality of text documents. Each class in the plurality of classes may correspond to an intended purpose of a text document. The data input 210 is configured to provide the training data 30 corresponding to the plurality of classes to the data processing module 230.

The memory 220 is configured to store instructions for the data processing module 230. The memory 220 may comprise, for example, one or more hard disc drives, solid state drives, or a combination as required. The memory 220 stores e.g. an algorithm, program, application, software etc. for execution by a processor, such as the data processing module 230. The instructions, when executed, may cause the data processing module 230 to execute a processing method, for example, to perform a training method for the multi-class classification model.

In some examples, the memory 220 is further configured to store operational data. Operational data may be stored persistently, for example, the memory 220 may record a final or intermediary output of the data processing module. In some examples, the memory 220 may store the training data 30. The memory 220 may store a plurality of training data corpuses, for instance, training data received at different points in time. In some examples, data may be stored transiently. The memory 220 may comprise one or more transient storage media e.g. flash memory.

The memory 220 may store parameters or variables required for computation for a short time only.

The data processing module 230 comprises one or more processors. The data processing module 230 is configured to receiving the training data 30 corresponding to the plurality of classes from the data input 210. Alternatively, in some examples the data processing module 230 may receive the training data 30 from the memory 220. The data processing module 230 is configured to train a binary classification model 231 for each class in the plurality of classes.

Each binary classification model 231 is configured to determine whether or not an observation of data, e.g. an observation in the training data 30, belongs to the class. For example, the binary classification model 231 for a certain class, such as the 'not interested' class mentioned previously, may determine whether or not an email document in the training data 30 belongs to the class. The binary classification model 231 is configured to process the observation of data and generate an output which is positive or negative according to whether or not the observation belongs to the class.

In some implementations, the binary classification model 231 comprises one or more algorithms, processes, pieces of software, code etc. stored in the memory 220. The binary classification model 231 comprises a multi-layer architecture. In some implementations, each layer may comprise a plurality of nodes. Each node may have a corresponding value e.g. between 0 and 1. The values of the plurality of nodes may be referred to as activations of the corresponding layer.

In some implementations, layers may be connected to one another. For example, adjacent layers may be connected to one another. Nodes in one layer may be connected with nodes in an adjacent layer on a one-to-one, one-to-many or many-to-one basis. In a processing operation, the activations of one layer may be determined based on the activations of a connected layer, e.g. a preceding layer. In some implementations, each connection between two nodes, known as an edge, may be assigned a value, e.g. between 0 and 1. The values of the plurality of connections may be referred to as weights, where the weights indicate an importance or priority of each connection. For example, where a node activation is determined based on the activations of two connected nodes, and the two connections are assigned different weights, the resulting activation will be influenced more strongly by the node with the higher weight.

In some implementations, the binary classification model 231 may comprise an input layer. The input layer may be configured to divide an input text document into a plurality of sentences. The input layer may be configured to evaluate a relative importance metric for a plurality of sub-features in a text document, for example, each word or each sentence in the text document. In some implementations, the input layer may use a term frequency—inverse document frequency tool (tf-idf). The tf-idf tool is configured to identify a predefined number of the most frequently used words in a text document, and allocate each of the identified words a value based on a determined relative importance of the word.

Alternatively, in some implementations an input layer may be configured to pre-process an input image. The input layer may be configured to divide an input image into a plurality of image regions. The input layer may be configured to use, for example, an edge detection tool to evaluate features of relative importance in the input image.

In some implementations, the binary classification model 231 may comprise an intermediate attention layer. The intermediate attention layer may comprise a plurality of nodes corresponding to a plurality of features in the input data. For example, the nodes of the intermediate attention layer may correspond to sentences or words in an input text document. Alternatively, the nodes of the intermediate attention layer may correspond to image features e.g. edges, in an input image. The intermediate attention layer is configured to indicate a relative importance of the corresponding features for subsequent layers in the binary classification model 231. Activations of the intermediate attention layer may be referred to as attention weights, and represent the relative importance of the corresponding feature in making a classification for the input data. In some implementations, the attention weights of the intermediate attention may sum to 1.

The binary classification model 231 may comprise a fully connected layer following the intermediate attention layer. A fully connected layer may be referred to as a dense layer. In some implementations, the fully connected layer may comprise a single node. The node of the fully connected layer may be connected with every node of a preceding layer. In some implementations, the fully connected layer may comprise a single output connection e.g. to a single output node. The activation of the fully connected layer may represent an output value for the binary classification model 231. The activation of the fully connected layer corresponds to an assessment of how much the input data belongs to the class. The fully connected layer may be configured to generate a sigmoid activation, based on a sigmoid function. That is, the activation value of the fully connected layer may He between 0 or 1. A binary output indicating whether or not the input data belongs to the class may be determined based on the sigmoid activation and a predefined threshold, e.g. 0.5.

In an initial state of each binary classification model 231, each parameter in the model is set to an initial value. For example, the parameters may be randomised.

The data processing module 230 is configured to train each binary classification model 231 using the training data. For each class, the data processing module 230 processes the observations in the training data 30 corresponding to the class using the binary classification model 231 for that class. Alternatively, in some implementations each binary classification model 231 may be configured to generate an output for each observation in the training data 30. Each output may be positive or negative according to whether or not the observation belongs to the corresponding class. The data processing module 230 may be configured to compare these outputs with the known classes of the observations in the training data 30. In the initial state, it is likely that a majority of the outputs are incorrect.

The data processing module 230 is configured to execute an update mechanism based on the comparison of the outputs. For example, the update mechanism may comprise a backpropagation technique. In this way, the parameters of each of the binary classification models 231 is updated. The steps of processing the observations and updating the parameters are repeated, with the effect that the accuracy of each binary classification model 231 is improved over time. This training process may be continued for a predefined number of cycles, or until a predefined level of accuracy is reached for some or all of the binary classification models 231.

According to an embodiment, the data processing module 230 is configured to train the plurality of binary classification models 231 using a first corpus of training data. In some examples, the first corpus of training data may be manually constructed such that each observation includes highly relevant features for the corresponding class. In some examples, the first corpus of training data may include one or more negative observations for a class which include random data to improve the performance of the binary classification model 231 corresponding to the class.

After training, the data processing module 230 is configured to extract one or more class identification features from one or more observations of training data. According to an embodiment, the data processing module 230 is configured to extract the class identification features from a second corpus of training data, different to the first corpus of training data. The class identification features are particular features of the training data 30 that strongly indicate that an observation belongs to a particular class. For example, in the context of image classification a visual feature corresponding to wheel may be a class identification feature for a class named 'vehicle'. In the context of document classification, the class identification features may correspond to words or sentences in the plurality of training documents.

For example, in the example shown previously for a document that can potentially be misclassified by a multi-class classification model:

"Sorry for taking so long to get back to you. I reviewed your offer with my manager yesterday. Even though it seems like a good fit at the moment we don't have the budget for it. We will contact you if it ever becomes a priority in the future. Thanks for your time!".

Before adding it to the training data of "not interested" class it would be beneficial to extract only the relevant parts to that class. In this case, the data processing module 230 may extract the following:

"Even though it seems like a good fit at the moment we don't have the budget for it. We will contact you if it ever becomes a priority in the future."

According to an embodiment, the first corpus of training data may be manually constructed such that each observation is predominantly or exclusively comprised of class identification features. The second corpus of training data may be real-world data, for example, data collected at a later time, which includes class identification features interspersed with additional parts which are not relevant, as above.

The data processing module 230 comprises a feature extraction unit 232 configured to extract the one or more class identification features from the observations of training data. The feature extraction unit 232 may be configured to extract the class identification features from the second corpus of training data. The feature extraction unit 232 may be configured to determine the class identification features based on activations of the intermediate attention layer in the binary classification model 231 for the class. For each class, the feature extraction unit 232 may be configured to select each observation of training data identified as belonging to the class. For example, the feature extraction unit 232 may be configured to select each observation of training data for which the corresponding binary classification model 231 generates a positive output. For each observation selected in this way, the feature extraction unit 232 is configured to consider the activations of the intermediate attention layer in the binary classification model 231.

In some implementations, the second corpus of training data may include one or more observations which do not correspond to any of the known plurality of classes. The data processing module 230 may be configured to label one or more observations of the training data which do not belong to any of the known plurality of classes. The data processing module 230 may be configured to process an unknown observation of the training data using each of the binary classification models 231. The data processing module 230 may be configured to label an observation if a negative output is generated by each of the binary classification models 231. The labelling of one or more observations in this way may be indicative of a new class of data. In some embodiments, the data processing module 230 may output one or more labelled observations to suggest the addition of a new class to the user. For example, the data processing module 230 may output one or more suggestions using a connected user interface or a connection with a user device.

As described above, nodes in the intermediate attention layer for a trained binary classification model 231 are mapped to features in the training data 30. For example, a certain word or sentence in the training data 30 may lead to a higher activation weight for a corresponding node in the intermediate activation layer. By considering the activations of the intermediate attention layer in the binary classification model 231, the feature extraction unit 232 is configured to identify the corresponding features in the training data 30. For example, the feature extraction unit 232 may identify one or more sentences in a selected observation that lead to high attention weights assigned in the intermediate attention layer that lead to a positive output from the binary classification model 231.

The feature extraction unit 232 may be configured to extract the class identification features based on whether or not an attention weight of the intermediate attention layer is higher than a predefined threshold. Alternatively, in some implementations the feature extraction unit 232 may be configured to extract a predefined number of class identification features based on the highest activations in the intermediate attention layer.

In some implementations, the feature extraction unit 232 may be configured to validate the extracted class identification features. The feature extraction unit 232 may be configured to process each extracted feature using the corresponding binary classification model 231. The feature may be validated if the binary classification model 231 generates a positive output for the feature. In some implementations, the feature extraction unit 232 may be configured to concatenate one or more features extracted from an observation and validate the concatenated features by processing with the corresponding binary classification model 231.

The data processing module 230 is configured to send the one or more extracted class identification features to an output 240. The output 240 is configured to output improved training data 40 based on the extracted class identification features. The improved training data 40 may be used for training a multi-classification model. According to an embodiment, the multi-classification model can be trained using the improved training data 40 instead of the second corpus of training data. In some examples, the multi-classification model may be trained at a first time using the first corpus of training data. The multi-classification model may be trained at a second time using the improved training data 40 in addition to the first corpus of training data.

The improved training data 40 comprises a number of observations. Each observation in the improved training data 40 may include one or more class identification features extracted from an observation of the training data 30. A plurality of class identification features extracted from an observation of the training data 30 may be concatenated to generate an observation in the improved training data 40.

In some implementations, the output 240 may be configured to output the improved training data 40 directly to a multi-classification model. The processing apparatus 200 may be configured to train the multi-class classification model using improved training data 40 comprising the extracted class identification features.

In this way, the processing apparatus 200 is configured to process the input training data 30 and output improved training data 40. The improved training data 40 is generated based on extracted class identifications. In this way, the relevance of the training data 30 can be improved. Training a multi-classification model using the improved training data 40 can provide improved accuracy in comparison with training using unprocessed training data, e.g., the second corpus of training data. The improved training data 40 can also improve the speed and processing efficiency of the training process.

Figure 3:
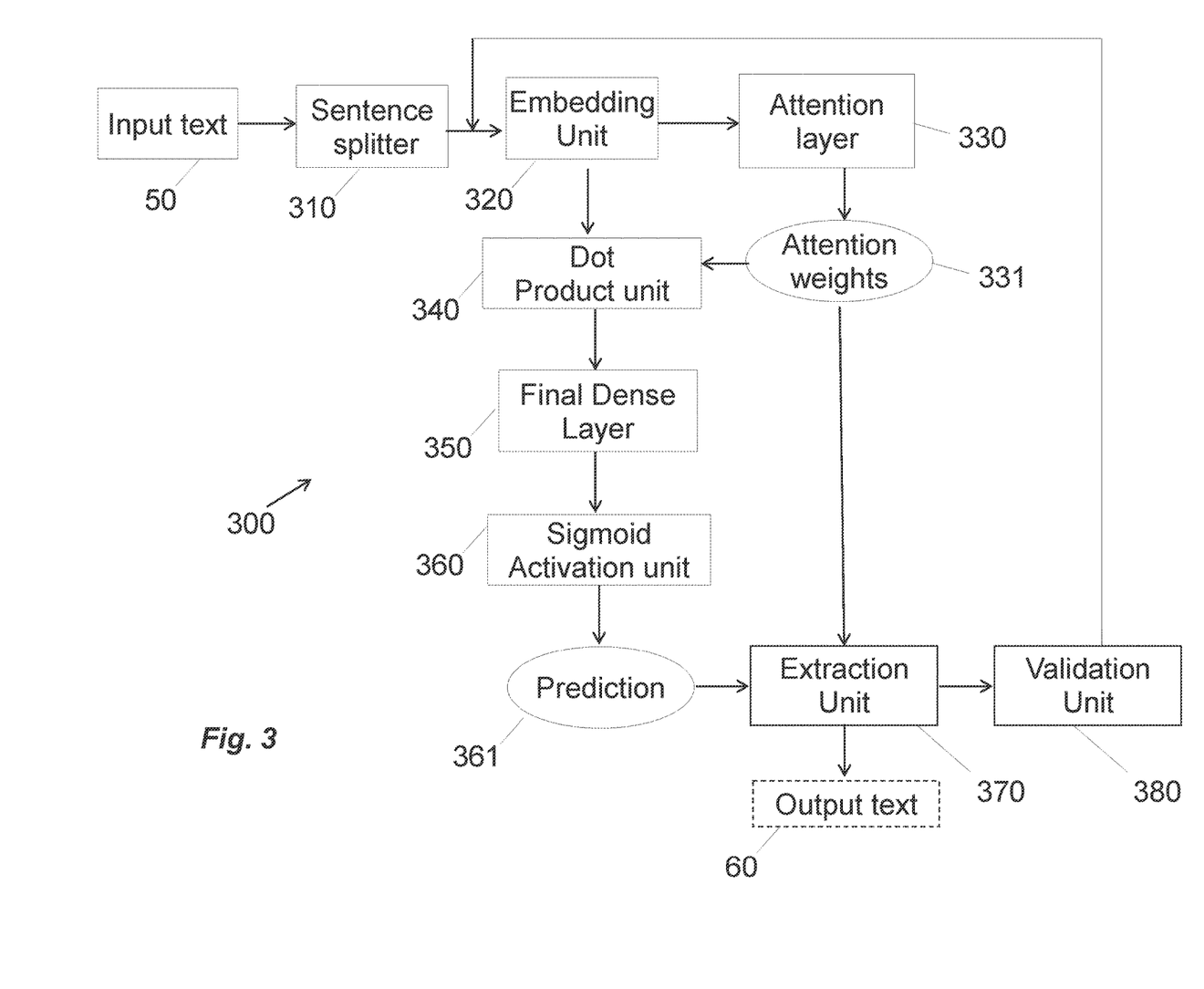
FIG. 3 is a schematic diagram showing a model architecture for a binary classification model, according to an embodiment of the present invention.

FIG. 3 illustrates an architecture for a data processing module 300 comprising a binary classification model and a feature extraction unit. According to an implementation, a binary classification model for document classification is shown. The binary classification model is configured to receive an input text 50 and generate an output text 60. In some implementations, the input text 50 may correspond to a plurality of training documents, and the output text may correspond to improved training data. The binary classification model comprises a sentence splitter 310, an embedding unit 320, an attention layer 330, a dot product unit 340, a final dense layer 350, a sigmoid activation unit 360, an extraction unit 370 and a validation unit 380.

The sentence splitter 310 is configured to receive the input text 50 and divide the input text 50 into a plurality of sentences.

The embedding unit 320 is configured to receive the plurality of sentences from the sentence splitter 310. The embedding unit 320 is configured to convert discrete data, e.g. categorical data, into continuous data. That is, the embedding unit 320 may take discrete sentences and generate a numerical/vector value representative of the sentence. The embedding unit 320 is a layer comprising a plurality of nodes corresponding to the plurality of embeddings, where the activations of the layer correspond to the numerical values representative of each sentence. The embedding unit 320 may map each sentence onto a unique vector, such that each sentence can be identified and processed by subsequent layers. In some implementations, the embedding unit 320 may perform embedding on the sentences level using one or more pre-trained models.

The attention layer 330 comprises a plurality of nodes corresponding to the plurality of embeddings. That is, the nodes of the attention layer 330 correspond to sentences in the input text 50. The attention layer 330 is configured to indicate a relative importance of the sentences in making a classification for the input text 50. The activations of the attention layer 330 are referred to as attention weights 331. In some implementations, a sum of the attention weights 331 may be equal to 1, The attention layer 330 is configured to output the plurality of attention weights 331 and provide the attention weights 331 to the dot product unit 340.

The dot product unit 340 is configured to perform a dot product operation between the plurality of embeddings and the plurality of attention weights 331. The dot product unit 340 is a layer comprising a plurality of nodes corresponding to the plurality of embeddings. Each node is connected with a corresponding node in the embedding unit 320 and a corresponding node in the attention layer 330. The activations of the dot product unit 340 are generated as a dot product between the corresponding embeddings and attention weights 331. That is, the dot product unit 340 is configured to apply the attention weights 331 to the corresponding sentences in vector form. The dot product unit 340 is configured to output the plurality of embeddings as weighted by the corresponding attention weights 331, The operation of the dot product unit 340 may result in a single vector which represents the entire input text 50.

The final dense layer 350 may be referred to as a fully connected layer. The final dense layer 350 comprises a single node, as described above. The node of final dense layer 350 is connected to each node of the dot product unit 340. The activation of the final dense layer 350 corresponds to an assessment of how much the input text 50 belongs to the class.

The sigmoid activation unit 360 is configured to map an output of the final dense layer 350 onto a sigmoid function. The mapped output has a value in the range of 0 to 1. The value of the mapped output represents the determined expectation that the input text 50 belongs to the class. The sigmoid activation unit 360 may also be configured to apply a threshold in order to generate a prediction 361 of whether or not the input text 50 belongs to the class. For example, a positive prediction may be generated if the mapped output has a value over the threshold e.g. over 0.5.

The extraction unit 370 is configured to extract text from the input text 50. The extraction unit 370 may be configured to extract sentences from the input text 50 if the sigmoid activation unit 360 generates a prediction 361 indicating that the input text 50 belongs to the class. For example, the extraction unit 370 may be configured to extract text when the sigmoid activation unit 360 generates a positive output.

The extraction unit 370 is configured to extract one or more sentences of the input text 50 based on the activation weights 331 generated by the attention layer 330. As described above, nodes in the attention layer 330 are mapped to sentences in the input text 50. For example, a certain sentence in the input text 50 may lead to a higher activation weight for a corresponding node in the attention layer 330. By considering the activations of the attention layer 330, the extraction unit 370 is configured to identify the corresponding sentences in the input text 50. The extraction unit 370 may be configured to extract the sentences based on whether or not an activation weight of the attention layer 330 is higher than a predefined threshold.

The validation unit 380 is configured to send each extracted sentence for processing by the binary classification model. The validation unit 380 sends the extracted sentence to the embedding unit 320. The sentence may be validated if the sigmoid activation unit 360 generates a positive output for the sentence. The extraction unit 370 is configured to send the validated sentence for output as an output text 60.

Figure 4:
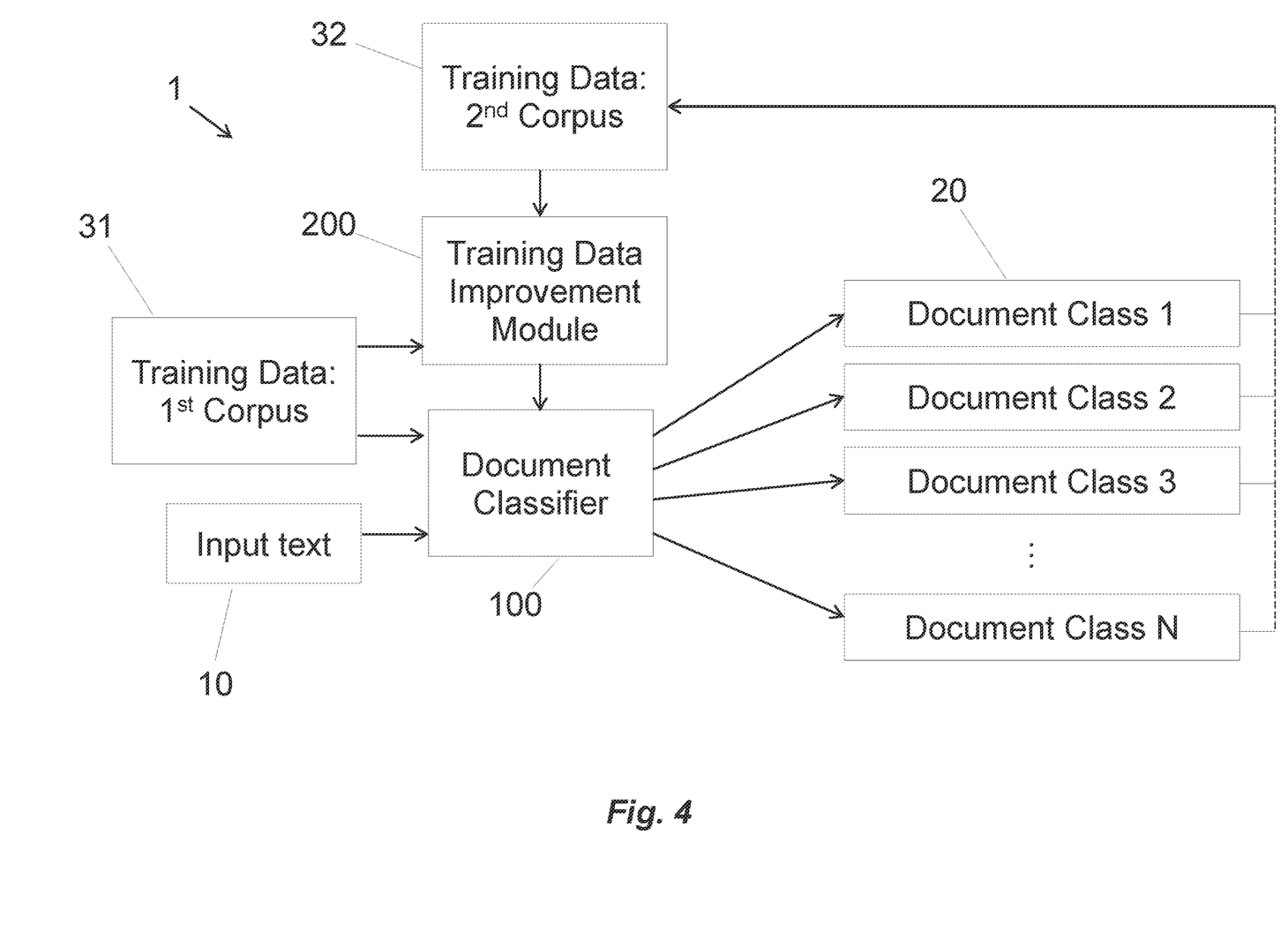
FIG. 4 is a schematic diagram showing a document classification system, according to an embodiment of the present invention.

FIG. 4 shows a block diagram of a classification system 1 according to an embodiment of the present invention. The classification system 1 comprises a document classifier 100 and a training data improvement module.

The document classifier 100 is substantially as described with respect to FIG. 1, and the training data improvement module comprises a processing apparatus 200 substantially as described with respect to FIG. 2. As described above, the document classifier 100 may initially be trained using a first corpus of training data 31. The first corpus of training data 31 may be manually constructed such that each observation is highly relevant to the corresponding class. In some embodiments, the binary classification models of the processing apparatus 200 may initially be trained using the first corpus of training data 31.

After training, the document classifier 100 is configured to receive input text 10 and assign the text to one of a plurality of document classes 20. In some implementations, an update mechanism may improve the classification system when a classification is confirmed as correct or incorrect. For example, user/client feedback or supervision may confirm that a document classification is correct or incorrect. A correct class may be determined and a new training data observation may be formed comprising the text document and the correct class. A second corpus of training data 32 may be collected in this way. In some implementations, each new training data observation may be processed by the training data improvement module 200 to extract one or more class identification features and generate improved training data.

In operation, training data is input into the training data improvement module 200. For example, the second corpus of training data 32 may be input into the training data improvement module 200. The training data may comprise a plurality of text documents each associated with a class, as described above. The training data improvement module 200 is configured to output improved training data, which is provided to the document classifier 100. The improved training data can be used to train or re-train the document classifier 100.

The document classifier 100 can be trained or re-trained substantially as described above, with the improved training data taking the place of the second corpus of training data 32. The document classifier 100 can be retrained with a combination of the first corpus of training data 31 and the improved training data which is based on the second corpus of training data 32. Training a multi-classification model using the improved training data can provide improved accuracy in comparison with training using the unprocessed second corpus of training data 32. The improved training data can also improve the speed and processing efficiency of the training process.

Figure 5:
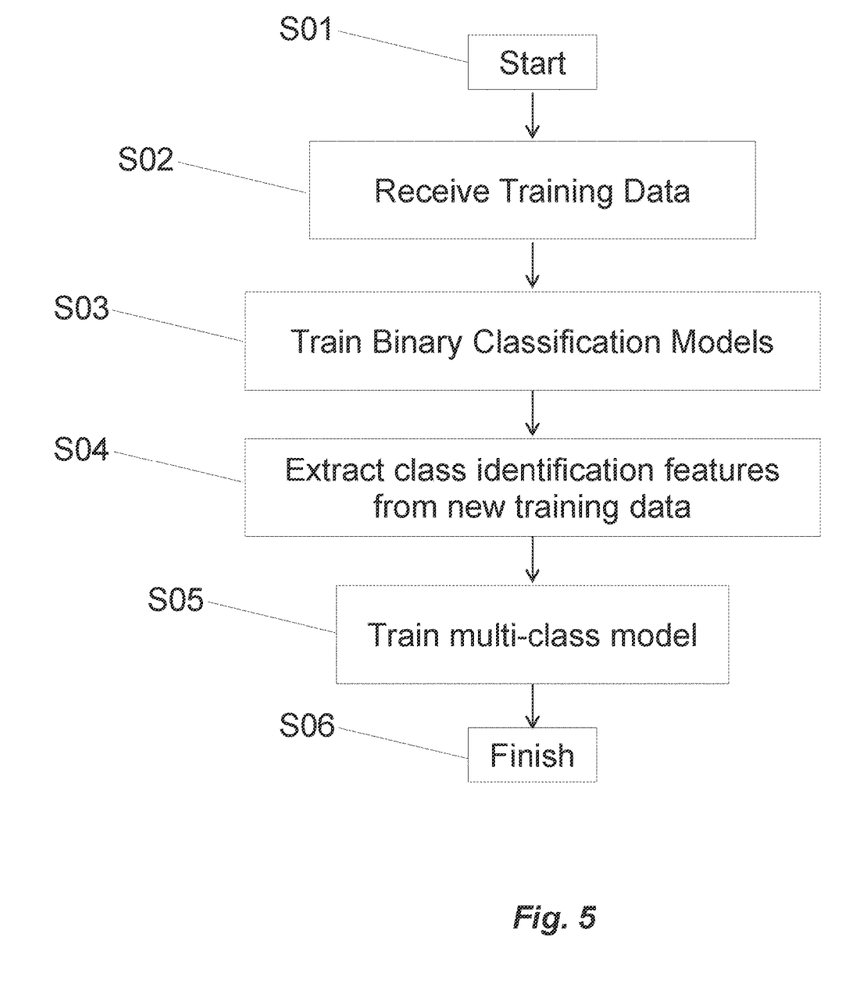
FIG. 5 is a flowchart showing a method, according to an embodiment of the present invention.

FIG. 5 of the accompanying drawings shows a flowchart representing a method of classification according to an embodiment. The method starts at step S01.

At step S02, a processor receives training data corresponding to a plurality of classes. The training data may be for training a multi-class classification model. The multi-class classification model may be a text classification model, and the training data may comprise a plurality of text documents. Each class in the plurality of classes may correspond to an intended purpose of a text document. In some examples, the training data may include a first corpus of training data and a second corpus of training data. The first and second corpuses may be received at different times.

At step S03, the processor trains a binary classification model for each class in the plurality of classes. Each binary classification model is configured to determine whether or not an observation of training data belongs to the class. The binary classification models may comprise an intermediate attention layer followed by a fully connected layer. For each class, training the binary classification model for the class comprises processing a plurality of observations in the training data corresponding to the class using the binary classification model for that class. In some example, the binary classification models may be trained using the first corpus of training data. The first corpus of training data may be manually constructed such that each observation of training data is highly relevant to the corresponding class.

At step S04, one or more class identification features are extracted from an observation of training data based on activations of an intermediate attention layer in the binary classification model. In some implementations, a plurality of observations of the second corpus of training data are processed using the binary classification models. The second corpus of training data may include collected real world data, e.g., a plurality of real world text documents. Each class identification feature may be extracted based on whether or not an activation weight of the intermediate layer is higher than a predefined threshold.

Extracting the class identification features may include dividing each of the training data text documents into a plurality of sentences. The class identification features may correspond to sentences extracted from the plurality of training documents in the second corpus of training data. The processor may label one or more observations of training data which do not belong to any of the known plurality of classes. The labelling of one or more observations in this way may be indicative of a new class of data At step S05, the processor trains a multi-class classification model using the class identification features extracted for each of the plurality of classes in the second corpus of training data. The processor may output improved training data for training a multi-class classification model, the training data comprising the class identification features. In some implementations, the multi-class classification model may be trained or re-trained using the improved training data instead of the second corpus of training data. The multi-class classification model may be trained using a combination of the first corpus of training data and the improved training data which is based on the second corpus of training data.

In this way, the processing apparatus is configured to process the second corpus of training data and output improved training data. The improved training data is generated based on extracted class identifications from the second corpus of training data. In this way, the relevance of the training data can be improved. Training a multi-classification model using the improved training data can provide improved accuracy in comparison with training using the unprocessed second corpus of training data. The improved training data can also improve the speed and processing efficiency of the training process.

The method finishes step at S06.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

The invention claimed is:

1. A computer-implemented method for training a multi-class classification model, comprising:
   receiving, by a processor, training data corresponding to a plurality of classes, wherein the training data comprises a first corpus and a second corpus, wherein the first corpus is constructed such that each observation of training data is relevant to a respective class of the plurality of classes, and wherein the second corpus includes collected real world data;
   for each class in the plurality of classes:
      training, by the processor, a binary classification model configured to determine whether or not an observation of training data of the first corpus belongs to a class based on activations of an intermediate attention layer, wherein the binary classification model comprises a plurality of layers including an input layer and the intermediate attention layer, the input layer configured to divide an input text document into a plurality of sub-features and to evaluate a relative importance of each of a plurality of sub-features in the input text document, and the intermediate attention layer including a plurality of nodes corresponding to the plurality of sub-features of the input text document, wherein the binary classification model uses the relative importance to identify whether the input text document belongs to the class; and
      extracting one or more class identification features from the observation of training data of the second corpus based on activations of the intermediate attention layer in the binary classification model; and
   training, by the processor, the multi-class classification model using the class identification features extracted for each of the plurality of classes.

2. The method of claim 1, wherein the multi-class classification model is a text classification model, and the training data comprises a plurality of text documents.

3. The method of claim 2, wherein each class in the plurality of classes corresponds to an intended purpose of a text document.

4. The method of claim 2, wherein the class identification features correspond to sentences extracted from the plurality of text documents.

5. The method of claim 2, wherein extracting the class identification features comprises dividing each of the training data text documents into a plurality of sentences.

6. The method of claim 5, wherein extracting the class identification features comprises evaluating a metric for each sentence in the plurality of text documents.

7. The method of claim 1, wherein each class identification feature is extracted based on whether or not an activation weight of the intermediate attention layer is higher than a predefined threshold.

8. The method of claim 1, wherein extracting the class identification features includes validating each feature using the corresponding binary classification model.

9. The method of claim 1, wherein the binary classification model comprises the intermediate attention layer followed by a fully connected layer.

10. The method of claim 1, further comprising labelling one or more observation of training data which do not belong to any of the plurality of classes.

11. A processing apparatus comprising a processor configured to execute a method comprising the steps of:
   receiving, by the processor, training data corresponding to a plurality of classes, wherein the training data comprises a first corpus and a second corpus, wherein the first corpus is constructed such that each observation of training data is relevant to a respective class of the plurality of classes, and wherein the second corpus includes collected real world data; and, for each class in the plurality of classes:
      training, by the processor, a binary classification model configured to determine whether or not an observation of training data of the first corpus belongs to a class based on activations of an intermediate attention layer, wherein the binary classification model comprises a plurality of layers including an input layer and the intermediate attention layer, the input layer configured to divide an input text document into a plurality of sub-features and to evaluate a relative importance of each of a plurality of sub-features in the input text document, and the intermediate attention layer including a plurality of nodes corresponding to the plurality of sub-features of the input text document, wherein the binary classification model uses the relative importance to identify whether the input text document belongs to the class; and
      extracting one or more class identification features from the observation of training data of the second corpus based on activations of the intermediate attention layer in the binary classification model; and training, by the processor, a multi-class classification model using the class identification features extracted for each of the plurality of classes.

12. The processing apparatus of claim 11, wherein the multi-class classification model is a text classification model, and the training data comprises a plurality of text documents.

13. The processing apparatus of claim 12, wherein each class in the plurality of classes corresponds to an intended purpose of a text document.

14. The processing apparatus of claim 12, wherein the class identification features correspond to sentences extracted from the plurality of training text documents.

15. The processing apparatus of claim 12, wherein extracting the class identification features comprises dividing each of the training data text documents into a plurality of sentences, and wherein extracting the class identification features comprises evaluating a metric for each sentence in the plurality of text documents.

16. A non-transitory, computer-readable medium configured to store instructions which, when executed by a processor, causes the processor to execute a method comprising the steps of:

receiving, by the processor, training data corresponding to a plurality of classes, wherein the training data comprises a first corpus and a second corpus, wherein the first corpus is constructed such that each observation of training data is relevant to a respective class of the plurality of classes, and wherein the second corpus includes collected real world data; and, for each class in the plurality of classes:

training, by the processor, a binary classification model configured to determine whether or not an observation of training data of the first corpus belongs to a class based on activations of an intermediate attention layer, wherein the binary classification model comprises a plurality of layers including an input layer and the intermediate attention layer, the input layer configured to divide an input text document into a plurality of sub-features and to evaluate a relative importance of each of a plurality of sub-features in the input text document, and the intermediate attention layer including a plurality of nodes corresponding to the plurality of sub-features of the input text document, wherein the binary classification model uses the relative importance to identify whether the input text document belongs to the class; and extracting one or more class identification features from the observation of training data of the second corpus based on activations of the intermediate attention layer in the binary classification model; and training, by the processor, a multi-class classification model using the class identification features extracted for each of the plurality of classes.

17. The non-transitory, computer-readable medium of claim 16, wherein each class identification feature is extracted based on whether or not an activation weight of the intermediate attention layer is higher than a predefined threshold.

18. The non-transitory, computer-readable medium of claim 16, wherein extracting the class identification features includes validating each feature using the corresponding binary classification model.

19. The non-transitory, computer-readable medium of claim 16, wherein the binary classification model comprises the intermediate attention layer followed by a fully connected layer.

20. The non-transitory, computer-readable medium of claim 16, wherein the method further comprising labelling one or more observation of training data which do not belong to any of the plurality of classes.

* * * * *